United States Patent
Sato et al.

[11] 3,904,342
[45] Sept. 9, 1975

[54] APPARATUS FOR MANUFACTURING OF TUBULAR BIAXIALLY STRETCHED FILM HAVING IMPROVED THICKNESS UNIFORMITY

[75] Inventors: Wasuke Sato; Osamu Uemura, both of Tokyo, Japan

[73] Assignee: Showa Denko Kabushiki Kaisha, Tokyo, Japan

[22] Filed: May 3, 1973

[21] Appl. No.: 356,782

Related U.S. Application Data
[63] Continuation-in-part of Ser. No. 129,390, March 30, 1971, abandoned.

[30] Foreign Application Priority Data
Apr. 3, 1970 Japan.................. 45-27864

[52] U.S. Cl.......... 425/384; 425/326 R; 425/387 R; 264/95; 264/209
[51] Int. Cl.............................. B29d 7/24
[58] Field of Search...... 425/66, 326 R, 384, 387 R; 264/209, 210 R, 290 R, 95, DIG. 65

[56] References Cited
UNITED STATES PATENTS
3,296,352   1/1967   Riggs................... 264/210 R X 3,456,044   7/1969   Pahlke.................... 425/326 X
3,608,019   9/1971   Sato et al................. 264/210 R X
3,725,519   4/1973   Seifried et al............. 264/210 R X FOREIGN PATENTS OR APPLICATIONS
942,096   11/1963   United Kingdom.................. 264/95
1,092,948   11/1967   United Kingdom.................. 264/209

*Primary Examiner*—R. Spencer Annear
*Attorney, Agent, or Firm*—Kurt Kelman

[57] ABSTRACT

A tubular biaxially stretched film of synthetic resin having little unevenness of thickness is produced by a method with high molding stability whereby the film is uniformly heated, stretched and cooled while the surrounding atmosphere of the film in motion is kept as free from disturbance as possible and the film itself is prevented from vibrating. For the production of this film, there is used as apparatus which comprises in combination a preheater barrel of which the portion for introducing a tubular film of synthetic resin is so constructed as to permit passage of the film alone and preclude passage of gas, a stretching barrel having a larger diameter than the preheater barrel and serving the purpose of stretching the film, and a cooling jacket adapted to give abrupt cooling to the stretched film so as to improve the stretching and molding stability.

10 Claims, 14 Drawing Figures

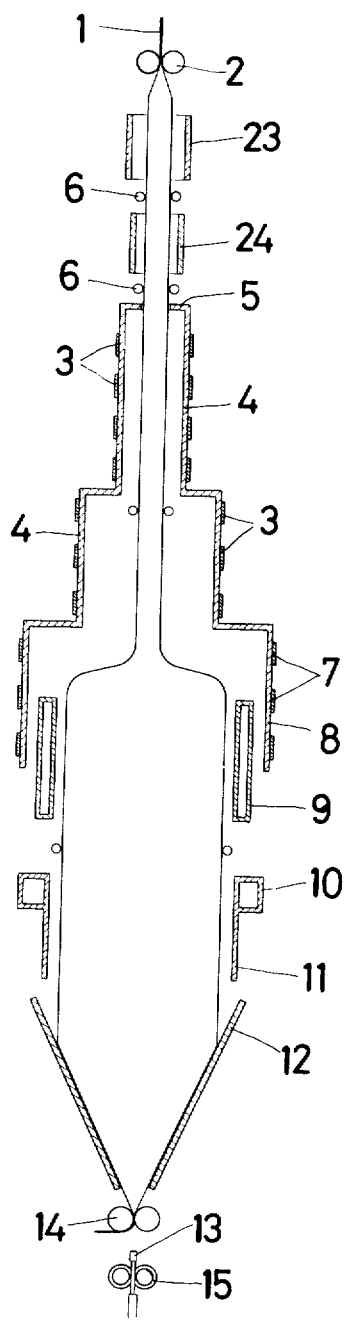
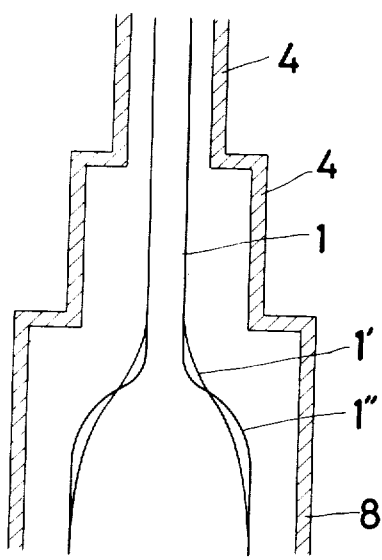

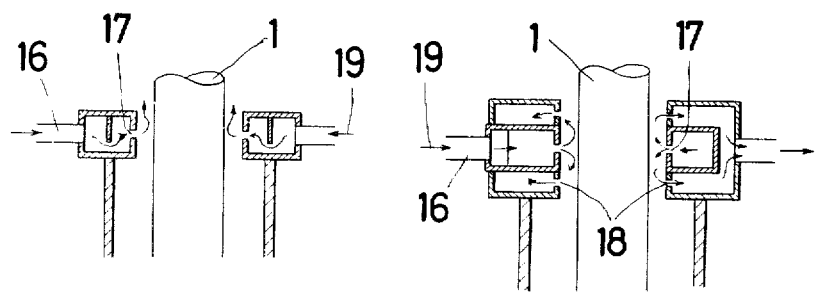
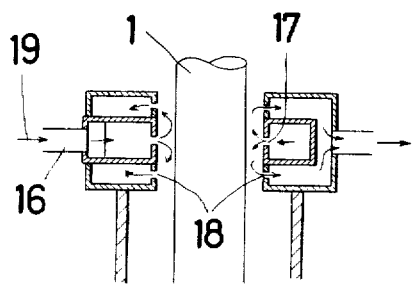
Fig. 3  Fig. 4
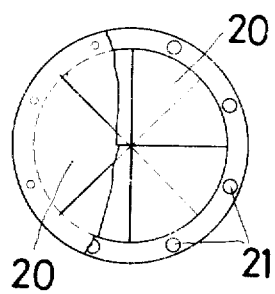
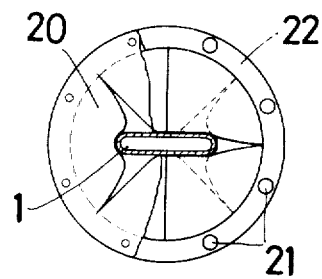
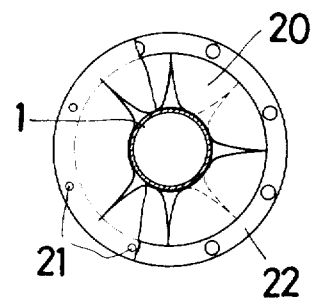
Fig. 5  Fig. 7  Fig. 9
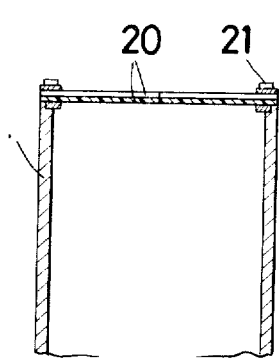
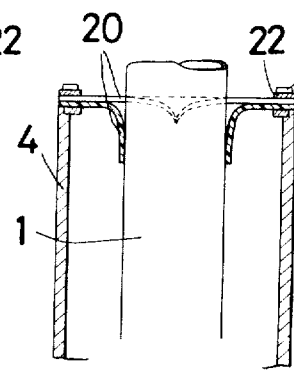
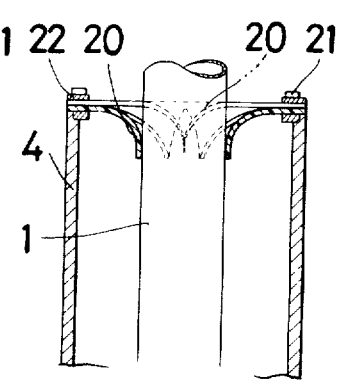
Fig. 6  Fig. 8  Fig. 10

3,904,342

APPARATUS FOR MANUFACTURING OF TUBULAR BIAXIALLY STRETCHED FILM HAVING IMPROVED THICKNESS UNIFORMITY

REFERENCE TO COPENDING APPLICATION

This is a continuation-in-part application of our copending application U.S. Ser. No. 129,390 filed Mar. 30, 1971, now abandoned.

BACKGROUND OF THE INVENTION

This invention relates to a method and apparatus for the manufacture of a tubular biaxially stretched film of synthetic resin.

According to the prior tubular process developed for the manufacture of a tubular biaxially stretched film, a tube of film is introduced into a space intervening between two pairs of nip rollers, i.e., an upper pair of nip rollers and a lower pair of nip rollers rotated at a higher speed than said upper nip rollers, and the film, while in a state containing a compressed gas inside, is heated until it reaches its stretchable temperature, at which temperature the film is stretched in the lateral direction by the compressed gas and, at the same time, stretched in the longitudinal direction by virtue of the difference in rotating speed between the upper and lower pairs of nip rollers. The biaxially stretched tubular film thus obtained is cooled, led along a V-shaped stabilizer plate in a flattened shape, foled so as to double upon itself by means of the lower pair of nip rollers and finally wound up as a product.

What is most important in this method of production is that the stretched film has the required wall thickness and the thickness is uniform throughout the film. However, tubes of film available for stretching (hereinafter referred to as "raw film") frequently suffer from unevenness of wall thickness and are susceptible to uneven cooling which is apt to upset the uniformity of the internal structure of film. It is extremely difficult to eliminate such uneven wall thickness and uneven cooling.

When the heating and stretching of the tube of film is effected by the known method, therefore, stretching of the film is not simultaneously started throughout the entire circumference of the raw film and the tension produced in the film is distributed unevenly in the circumferential direction, with the result that the film being stretched will vibrate while in motion. Since this vibration aggravates the relative unevenness in wall thickness of the raw film while the raw film is undergoing the stretching treatment, it is difficult to obtain a quality product which has little unevenness of wall thickness.

One may possibly conceive of incorporating a ring or rollers adapted to prevent the film from producing subc vibration. In order for such an auxiliary device to be disposed at a part effective for the prevention of the film vibration, it is inevitably located where the film is at an elevated temperature. Thus, it tends to injure the film or it makes contact with a part of the film and escapes contact with the remaining part to give rise to varied thermal hysteresis in the film which impedes uniform stretching of the film.

If the auxiliary device is disposed where it produces absolutely no such adverse effect upon the film, then the position thereof is inevitably remote from the position at which stretching of the film starts. Thus, it causes the vibration of film to increase in moment and fails to attain the expected effect. In producing a biaxially stretched film by the tubular process, therefore, it is extremely difficult to device a mechanical means for effective prevention of the film vibration.

SUMMARY OF THE INVENTION

The present invention, accomplished in view of the situation mentioned above, relates to an improved method and apparatus for the manufacture of a tubular biaxially stretched film which has little unevenness in thickness. More particularly, it relates to a method and apparatus for enabling the tube of film to be uniformly heated and cooled in the absence of vibration so as to provide improved stretch molding stability.

Specifically, in a method for manufacturing a tubular biaxially stretched film of synthetic resin by introducing a tube of raw film of synthetic resin into a space intervening between an upper pair of nip rollers and a lower pair of nip rollers rotated at a higher speed than said upper nip rollers and heating the tube of film while in a state containing therein a compressed gas thereby causing said film to be stretched simultaneously in the longitudinal and lateral directions, the present invention relates to an improvement which comprises (a) introducing the tube of raw film of synthetic resin downwardly via a head portion into a preheater barrel, of which the outer wall incorporates an indirect heater element and the inner wall is downwardly enlarged stepwise in diameter and the head portion used for said introduction of the tube of film is designed so as to prevent passage of gas, and allowing the film to descend through the interior of the preheater barrel while being heated substantially with the heat radiated from the outer wall so as to be gradually raised in temperature, (b) causing said tube of film to enter the interior of a heater barrel adjoining the lower-most end of said preheater barrel and having a diameter larger than the diameter at the lowermost part of the inner wall of said preheater barrel for thereby allowing said tube of film to be elevated to a temperature at which the film begins to be stretched so that said compressed gas functions to stretch the heated film to a required diameter and at the same time the difference in rotating speed between the upper and lower pairs of nip rollers induces longitudinal stretching of the film and (c) giving abrupt cooling to said stretched tube of film by means of a water-cooling jacket disposed around the tube of film to intercept the radiant heat from said outer wall. If occasion requires, this invention further embraces a method whereby preliminary heating is given to the tube of film after the tube has passed the upper pair of nip rollers and before it enters the preheater barrel or the raw film is subjected to local heating for required elimination of uneveness of wall thickness in the final product or a method whereby the film which has undergone said abrupt cooling is additionally cooled by allowing a current of gas to flow along the surface of the film. This invention relates also to an improved heating apparatus for use in a biaxial stretching system for the manufacture of a tubular film of synthetic resin comprising an upper pair of nip rollers adapted to introduces a tube of film of synthetic resin, a lower pair of nip rollers rotated at a greater speed than said upper nip rollers, a heater unit disposed to intervene between said two pairs of nip rollers, a V-shaped stabilizer plate and a gas-introducing unit. The improved heating apparatus comprises in combination (a) a preheater barrel consisting of (a') a head portion adapted to permit passage of the tube of film and impede passage of gas and (a'') an inner wall which has a diameter greater than the diameter of the tube of film, gains stepwise in diameter downwardly and incorporates an indirect heater element and (b) a stretching barrel adjoining the lowermost end of the outer wall of said preheater barrel and formed of an outer wall, the inner wall of which has a diameter greater than the stretched tube of film and incorporates an indirect heater element and (c) a water-cooling jacket disposed below half the height of said stretching barrel around the stretched tube of film to effect abrupt cooling of the tube of film by intercepting the radiant heat emanating from the outer wall of the stretching barrel toward the tube of film.

If required for the purpose of improving productivity, the present invention embraces an apparatus which is provided with a draft tube incorporating therein an air-cooling ring for drawing air to establish a current of air along the surface of the tube of film below said water-cooling jacket.

If occasion requires, this invention also embraces an apparatus in which a preliminary heater unit is disposed between the upper pair of nip rollers and the preheater barrel for the purpose of elevating the film temperature to a certain degree in advance and slit heaters designes to eliminate unevenness of wall thickness in the final product to the stretching barrel.

The apparatus of the present invention, if occasion requires for the purpose of more accurate regulation of the temperature gradient inside the barrels, further embraces a device wherein shielding plates are disposed on the inner surfaces of the preheater barrel and the stretching barrel.

It is a primary object of this invention to provide a method for the manufacture of a tubular biaxially stretched film having substantially no unevenness of thickness from a raw film.

Another object of this invention is to provide a method for the manufacture of a tubular biaxially stretched film excellent in stretch molding stability.

Still another object of this invention is to provide an apparatus for the manufacture of a tubular biaxially stretched film having substantially no unevenness of thickness.

Yet another object of this invention is to provide an apparatus for the manufacture of a tubular biaxially stretched film excellent in stretching molding stability.

Other objects and other characteristic features of the present invention will be explained in detail herein below with reference to the accompanying drawings.

BRIEF EXPLANATION OF THE DRAWING

FIG. 1 is an explanator diagram illustrating the condition in which a film is stretch molded.

FIG. 2 is a diagram illustrative of a preferred embodiment of the apparatus of the present invention.

FIG. 3 and FIG. 4 are diagrams each illustrating a preferred embodiment of the air curtain system to be formed above the preheater barrel.

FIG. 5 is a partially cutaway plan view of the rubber seal system formed above the preheater barrel.

FIG. 6 is a longitudinal sectional view of the diagram of FIG. 5.

FIG. 7 is a partially cutaway plan view illustrating a folded tube in the process of passing the rubber seal system of FIG. 5.

FIG. 8 is a longitudinal sectional view of the diagram of FIG. 7.

FIG. 9 is a partially cutaway plan view illustrating a gas containing tubular film in the process of passing the rubber seal system of FIG. 5.

FIG. 10 is a longitudinal sectional view of the diagram of FIG. 9.

DETAILED DESCRIPTION OF THE INVENTION

Figure 13:
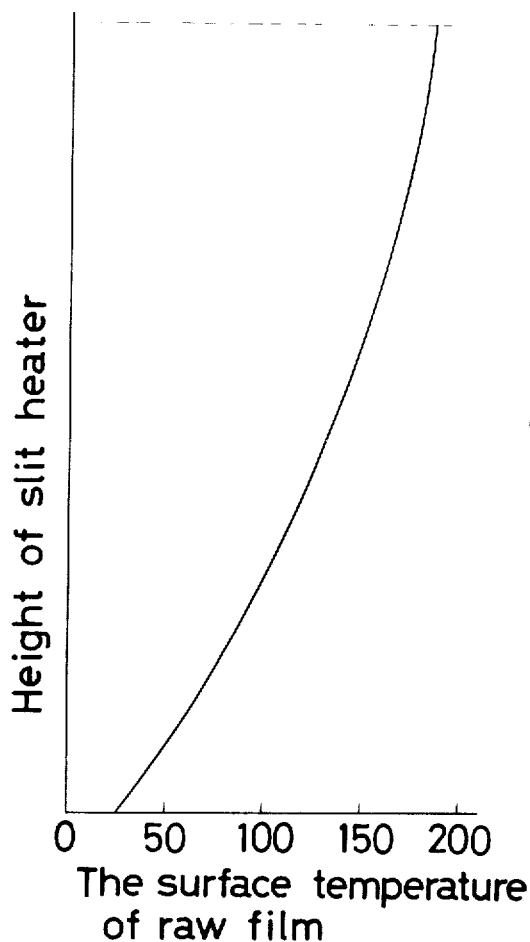
FIG. 13 is a diagram illustrating a temperature distribution resulting from the use of slit heaters.

A raw film is introduced via the upper pair of nip rollers and, while in a state containing therein a compressed gas, is subjected to preheating. This heating must be carried out so as to minimize possible temperature variation in the thickness and circumferential directions of the raw film as much as possible.

To accomplish this purpose, the present invention introduces the raw film into a preheater barrel which has a head portion so constructed as to permit passage of the raw film and prevent passage of gas and which is formed of an inner wall gaining stepwise in diameter downwardly and incorporating an indirect heater element and therefore effects preheating of the film therein.

In this case, possible unevenness of temperature inside the preheater barrel decreases and consequently the unevenness of temperature in the circumferential direction of the raw film decreases in proportion as the diameter of the inner wall of the preheater barrel incorporating the indirect heater element increases relative to the diameter of the tube of film. In consideration of thermal efficiency, equipment cost and other factors, however, it is not advantageous to enlarge the diameter of the inner wall of the preheater barrel throughout the entire barrel length. The present invention, therefore, introduces the raw film downwardly via the head portion into the interior of a preheater barrel which gains stepwise in diameter downwardly. Take, for example, a preheater barrel of which the upper half has a diameter about 2.0 to 3.5 times the diameter of the tube of raw film and the lower half has a still larger diameter. Possible unevenness of temperature occuring in the raw film during its travel through the upper half of the barrel can sufficiently be remedied while the tube of film is descending through the lower half of the barrel which has an increased volume.

At times, the shape of film being stretched is more readily stabilized when it is subjected to abrupt heating immediately before the film reaches its stretchable temperature than otherwise, depending on the kind of resin used for the film and the conditions for stretching. The fact that the heat capacity for the purpose of heating increases with the size of diameter also warrants necessity for a larger barrel diameter.

The method of this invention is characterized among other things by the fact that the head portion of the preheater barrel into which the raw film is introduced has a structure such as to preclude passage of gas. If the head portion was constructed to permit passage of gas, then the gas reaching the interior of the preheater barrel would be heated by the indirect heater element to generate as ascending current of air. This ascending current of air, for example, could have a flow speed of 3 m/second.

The results of the inventor's experiments indicate that the vibration of the bubble (term used to refer to the "tube of film being stretched") gains in intensity in proportion as the flow of air increases in magnitude within the preheater barrel, particularly in the neighborhood of the point at which the film reaches its stretchable temperature. Occurrence of the ascending current of air implies presence of a considerable flow of air in the neighborhood of the point of which the film reaches its stretchable temperature and induces vibration of the bubble.

This vibration of the bubble is a major cause for uneven temperature distribution in the film and consequently uneven stretching. Further, the ascending current of air gives off heat to elevate the temperature of parts (such as, for example, upper pair of nip rollers) which are disposed prior to the arrival at the preheater barrel and the heat given off by these heated devices goes to elevate the temperature of the raw film in motion unevenly in the circumferential direction, giving rise to uneven temperature distribution in the film. To preclude this inconvenience, the present invention causes the head portion of the preheater barrel to be formed in a structure of an air curtain, for example, so as to permit passage of the raw film and impede passage of the ascending current of air. Accordingly, the raw film is admitted into the preheater barrel without being affected by the ascending current of air, gradually heated substantially uniformly in the circumferential direction by the mild heating effected by the outer wall incorporating the indirect heater element, remedied in unevenness of temperature distribution as it continues its descent through the barrel interior, and passed into a stretching barrel which has a larger diameter than the preheater barrel and incorporates an indirect heater element in the outer wall. Within this stretching barrel, the raw film is heated to a temperature at which stretching of the film starts. At this point, uneven temperature distribution in the circumferential direction of the raw film is completely eliminated and, because of the mild heating provided by the preheater barrel which incorporates said indirect heater element, the temperature gradient in the thickness direction of the raw film becomes very slow.

After the raw film has reached this temperature, it is biaxially stretched by the action of the compressed gas contained therein and the cooperative action of the upper and lower pairs of nip rollers. In this case, the raw film is stretched very smoothly, because it is substantially relieved of uneven temperature distribution as described above.

Then the film enters the water-cooling jacket. Since this jacket serves the purpose of intercepting the radiant heat emanating from the aforesid stretching barrel, the film is allowed to cool off abruptly so that the stretching of the raw film is effected in a short zone. In addition, the shape of the bubble is invariable and the point at which stretching of the raw film starts is fixed. Thus, the film is stretched under stabilized molding conditions.

Referring now to FIG. 1, 4 denotes a preheater barrel, 8 a stretching barrel and 1 a film. The numerals 1″ and 1′ respectively denote a film of the present invention stretched under stabilized molding conditions and a film stretched in the absence of a water-cooling jacket according to prior art. Since the water-cooling jacket is additionally capable of repressing possible effect of the air flowing on the outside, there is practically no possibility of the raw film acquiring uneven temperature distribution.

Although the water-cooling jacket may suitably be disposed in the lower half of the height of the stretching barrel, the selection of its position between the stretched film and the inner wall surface of the stretching barrel proves particularly advantageous as described herein below.

The raw film reaches the highest temperature at the point at which stretching of the raw film starts. The air in this neighborhood moves in conjunction with the film in motion. A volume of air equalling that of the air thus moved out of the said neighborhood is caused to ascend through the opening between the water-cooling jacket and the wall surface of the stretching barrel while being heated by the indirect heater element incorporated in the outer wall. The inner wall at the lower half portion of the stretching barrel which is opposed to the water-cooling jacket, thus functions to heat the air moving into the streching barrel. This heating is quite effective for starting the stretching of the film very smoothly.

The water-cooling jacekt enables the film to be cooled without being affected by the radiant heat emanating from the wall of the stretching barrel. This cooling is required to lower the film substantially to about 10° to 80°C below the softening point of the film. Subsequent to the treatment by the water-cooling jacket, a desired tubular biaxially stretched film can be obtained by following the remaining steps of the procedure of prior art.

This invention also embraces a method which additionally includes a cooling step wherein a current of air is caused to flow along the surface of the film emerging from the preceding abrupt cooling step utilizing the water-cooling jacket. Inclusion of this cooling step heightens the molding stability of the stretched film, permits an increase in the stretching speed and consequently improves the productivity. The current of air flowing along the surface of the film serves the purpose of keeping the surrounding air of the film from possible disturbance. If this cooling was effected by a means apt to disturb the surrounding air as by mere blowing of air, for example, the film would be vibrated and the blow air would ascend to stir the air surrounding the point at which stretching of the film starts. These effects all obstruct uniform heating of the raw film.

According to this invention, a tubular biaxially stretched film having a very little variation in thickness can easily be manufactured at a high efficiency by selecting stretching conditions suitable for the resin of which the raw film is made, irrespectively of the kind of resin. The method of this invention can be applied to the manufacture of a wide spectrum of thermoplastic resin films. It is particularly suitable for the manufacture of films, simple or complex in construction, from polyethylene resin, polypropylene resin, polyvinyl chloride resin, polyamide resin and polyester resin.

Now, a description is made of the apparatus of this invention. This apparatus is intended for use in practicing the method of the present invention. The explanation is made with reference to FIG. 2 which depicts one preferred embodiment of this invention. In the drawing, 1 denotes a raw film and 2 an upper pair of nip rollers which serves to admit the raw film 1 into the apparatus and, together with lower nip rollers 14, seal in the internal compressed air. Denoted by 4 is an outer wall which gains stepwise in diameter downwardly, incorporates an indirect heater element 3 and forms a preheater barrel in conjunction with a head portion 5. The head portion 5 of the preheater barrel is so constructed as to permit the passage of the raw film and impede the passage of gas. It is formed in the structure of an air curtain or rubber seal, for example. A guide roller 6 supports the raw film 1 in position. Numeral 8 denotes an outer wall the inner wall of which has a larger diameter than the inner wall of the preheater barrel, incorporates an indirect heater element 7 and forms a stretching barrel for elevating the raw film up to its stretchable temperature. A water-cooling jacekt 9 is disposed around the tube of film so as to intercept the radiant heat emanating from the indirect heater element in the outer wall 8 and consequently effect required cooling of the film. Below the jacket, there are disposed a V-shaped sabilizer plate 12, a lower pair of nip rollers 14, a nozzle 13 for injecting a gas into the tube and gas-sealing rolls 15 similarly to an apparatus known to the art.

The water-cooling jacket may be provided with fins and similar means for improving the cooling efficiency. Effective cooling may be obtained by circulating such coolant as Freon gas or ammonia through the jacket in place of water. The jacket may be wrapped in cloth so as to prevent possible infliction of contact injuries to the stretched film.

It is plain that the method of the present invention can be practiced by the use of the apparatus of this invention.

Referring further to the drawing, a draft tube 11 which has additionally incorporated therein an air-cooling ring adapted to effect suction of the air is disposed below the water-cooling jacekt 9. The draft tube 11 serves the purpose of establishing a current of air along the surface of the tube of film. The suction effected by the air-cooling ring causes a current of air to flow inside the draft tube along the surface of the film, with the result that additional cooling is given to the film. The draft tube is incorporated as circumstances require and it is embraced by the present invention. A V-shaped stabilizer plate 12, a lower pair of nip rollers 14, a gas-injecting nozzle 13 and gas-sealing rolls 15 are disposed below this draft tube as taught by prior art. Incorporation of said draft tube heightens the molding stability of the film further, increases the stretching speed and improves the productivity all the more.

If required for the purpose of enhancing the effect of mild heating within the stretching barrel, the present invention carries out various forms of preheating enroute from the upper pair of nip rollers and the preheater barrel.

The apparatus of FIG. 2 is seen to be provided with a hot air circulation type heater unit 23 and slit heaters 24. The hot air circulation type heater unit 23 is intended to effect rough heating for the sake of preheating. For this purpose, the heater unit has a structure such that hot air prepared in advance is introduced via one end into the unit to give rough heating to the raw film and the spent hot air is discharged via the opposite end of the unit, heated again to the former temperature and circulated back to the unit for repeated service. The slit heaters 24 serve theh purpose of diminishing possible unevenness of thickness of the tube of film resulting from the ununiform thickness in the raw film. These heaters are so designed so as to provide local heating to portions of the raw film having a larger thickness. They have a structure containing a slit through which the heat generated inside is emitted. They may be disposed suitably around the path of the tube of raw film.

If occasion demands, these slit heaters may be positioned inside the preheater barrel.

Now, a typical structure of the head portion 5 of the aforementioned apparatus will be explained. FIG. 3 and FIG. 4 each depict a preferred embodiment of the air curtain to be formed therein. In the diagrams, 1 denotes the raw film and 19 the heated air. In FIG. 3, the heated air 19 introduced via an inlet 16 of the air curtain unit is spurted out of an outlet 17 against the raw film 1. In FIG. 4, the heated air 19 is introduced via the inlet 16, spurted out of the outlet 17 against the raw film 1, and thereafter sucked in via a suction inlet 18. The air curtain of the design of FIG. 3 merely functions to blow air against the film, so that the spent air is allowed to scatter in all directions. In this respect, use of the air curtain of the design of FIG. 4 is preferable.

The rubber seal unit similarly used for the head portion will be explained with reference to FIGS. 5 through 10. FIG. 5 and FIG. 6 are a plan view and a longitudinal sectional view of the rubber seal unit not yet in the process of admitting the raw film. FIG. 7 and FIG. 8 are a plan view and a longitudinal sectional view illustrating the rubber seal unit in the process of admitting the raw film folded to double over itself. FIG. 9 and FIG. 10 are a plan view and a longitudinal sectional view illustrating the rubber seal unit in the process of admitting the raw film in the course of stretching. The plan views mentioned above invariably contain a partially cutaway portion to expose to sight the shape of the rubber sheet disposed underneath. Referring to the diagram, 1 denotes the raw film, 4 a heater barrel, 20 a rubber sheet, 21 a bolt to hold the rubber sheet in position and 22 a frame plate. The seal system is characterized by the shape of the rubber sheet. As shown in the diagram, two layers of circular rubber sheets are formed in each rubber seal unit, with each layer of rubber sheet composed of four equally divided sectors as shown. The two layers of rubber sheets are so positioned relative to each other that the sectors of the upper layer are staggered from those of the lower layer. When the raw film folded to double over itself is passed through this seal unit, the rubber sheets are deformed to the shape as illustrated in FIG. 7 and FIG. 8. When the raw film being stretched is passed therethrough, the rubber sheets are deformed to the shape as shown in FIG. 9 and FIG. 10. In either case, the rubber sheets permit passage of the raw film, and since these rubber sheets are elastic enough to fit tight against the raw film as it passes, the gas inside the heater barrel is prevented by these rubber sectors from ascending and escaping to the exterior. The shape of the rubber sheets is not limited to that which is illustrated. The purpose contemplated can be fulfilled so far as a plurality of circular rubber sheets each having cuts formed regularly from the center toward the circumference are layered in such way that the cuts in each succeeding layer are staggered from those in the preceding layer.

Figure 11:
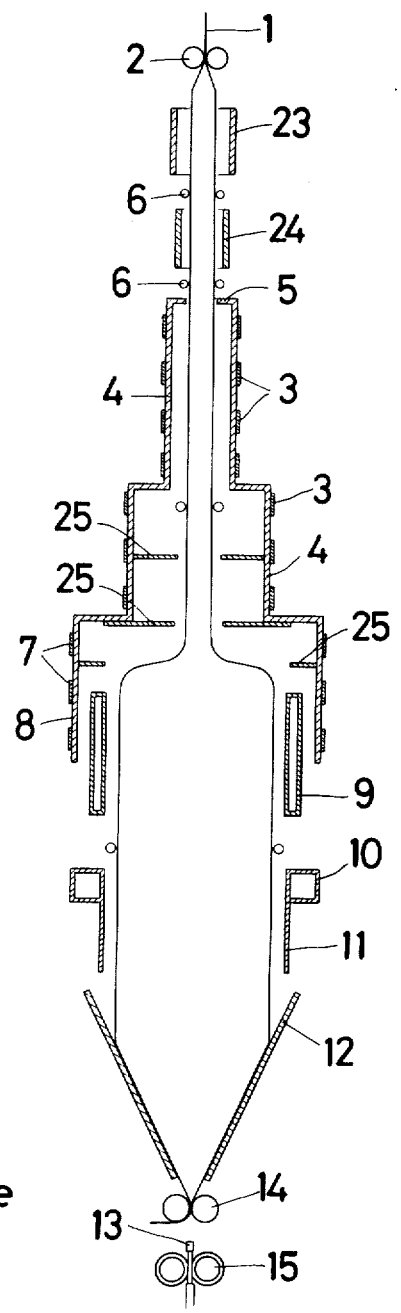
FIG. 11 is a diagram illustrating one preferred embodiment incorporating shielding plates in the apparatus of the present invention.

The apparatus of the present invention can have, as illustrated in FIG. 11, a shielding plate 25 positioned each on the inside wall of the preheater barrel 4 and that of the stretching barrel for the purpose of facilitating the control of temperature gradient in the barrels mentioned. As a result, the raw film can be subjected to abrupt heating immediately before it reaches the temperature at which stretching of the film starts. At the same time, the shielding plates serve to block the layers of air independently within the preheater barrel and the stretching barrel to effect improved repression of the overall movement of air within the barrels. This results not only in increased stretch molding stability but also in decreased unevenness of film thickness. Such factors as quantity, size, shape and location of shielding plates may suitably be selected by taking into account the kind of synthetic resin of which the raw material is made, conditions for stretching and the like.

If circumstances require, the effect of the prevention of the surrounding air from disturbance can further be increased by having a shielding membrane disposed below the stretching barrel in such a way as to cover up the water-cooling jacket. This shielding membrane may be made of polyvinyl chloride resin, for example.

The effect of the aforementioned slit heaters will be explained with reference to one typical structure thereof.

Figure 12:
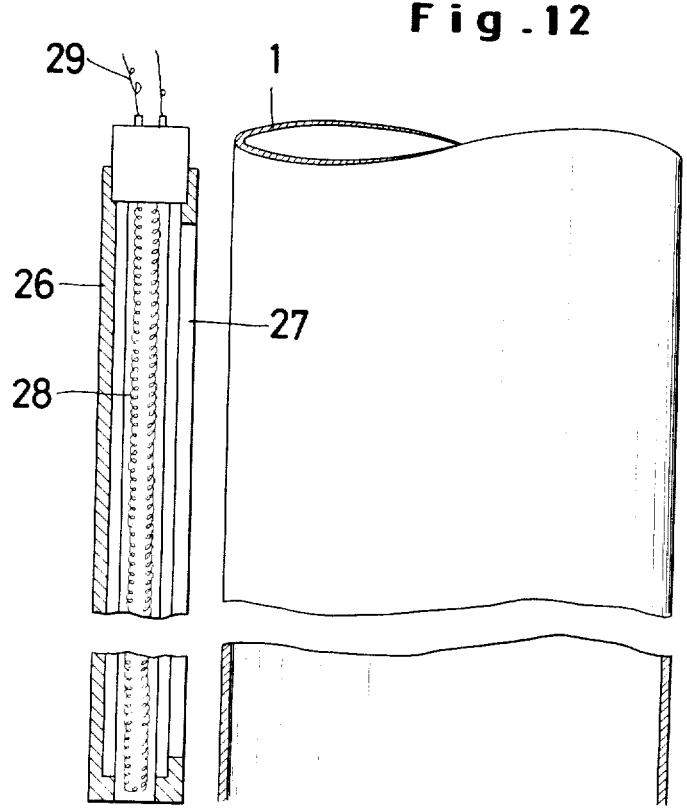
FIG. 12 is a diagram illustrative of one preferred embodiment of the slit heaters.
Figure 14:
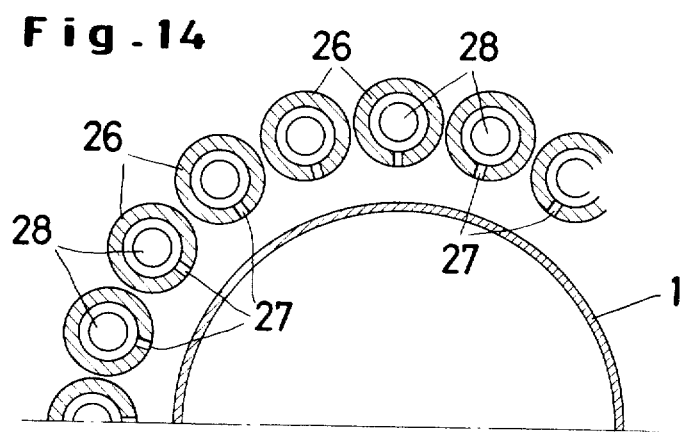
FIG. 14 is a diagram illustrating one embodiment having a plurality of slit heaters disposed around the tube of film.

FIG. 12 illustrates one slit heater, wherein 1 denotes the raw film, 26 the outer wall of heater, 27 a slit, 28 an extreme infrared-ray heater or the like and 29 an electric cable. The air heated by the extreme infrared-ray heater flows out of the upper section of the slit 27, runs against the film and disperses. At the same time, cold air flows through the lower section of the slit into the heater interior. FIG. 13 shows a typical temperature distribution as obtained with the slit heater of FIG. 12 wherein an extreme infrared-ray heater rated for 200V and 750W is used at a potential of 150V. The air heated by this heater generates an ascending current of air, which locally elevates the temperature at the thickened portion of the raw film travelling opposite the slit. This local heating is highly effective in eliminating unevenness of stretched film thickness. If it were not for the effect of this ascending current of aim, required local heating could not be obtained by the radiant heat alone, unless the potential were increased excessively. FIG. 14 shows a plurality of slit heaters which are arranged around the path of the tube of film 1, wherein 27 denotes a slit, 26 a heater wall and 28 an extreme infrared-ray heater proper respectively of each slit heater. When a multiplicity of slit heaters are disposed around the path of the tube of film as illustrated in FIG. 14, unevenness of film thickness can easily be eliminated by putting to work those slit heaters which are positioned opposite the portions of film having increased thickness. A smaller number of slit heaters, if movably arranged, can achieve the same effect.

As is clear from the foregoing explanation, a tubular biaxially stretched film of synthetic resin having very little variation in thickness and excelling in molding stability can easily be manufactured at a high productivity by practicing the method of the present invention by the use of the apparatus of this invention.

The present invention will be described in further detail herein below by referring to preferred working examples thereof, which are illustrative, but not limitative in any way, of the invention.

EXAMPLE 1

Biaxial stretching was carried out by the use of an apparatus of this invention illustrated in FIG. 2 under the conditions indicated below.

| Resin used | Polypropylene (MFI 2.0), "Shoallomer FA120" |
|---|---|
| Thickness of raw film | 750 μ |
| Folded width of raw film | 154 mm |
| Stretching ratio | M.D. 6.25 × T.D. 6.30 |
| Speed | 2.4 m/min. in raw film feeding speed |
|  | 15.0 m/min. in stretched film speed |
| Inner pressure of stretched film | 99 mm Aq. |
| Temperature conditions: | Device interior / Film surface |
| Hot air-circulation type heater unit | 140°C / 100°C |
| Upper stage, preheater barrel | 201°C / 110°C |
| Medium stage, preheater barrel | 229°C / 126°C |
| Lower stage, preheater barrel | 250°C / 140°C |
| Stretching barrel | 132°C / 145°C |
| Water of water-cooling jacket | 20°C / 75°C |
| Air speed at upper air curtain | 7 m/sec. |
| Air speed at draft tube | 2m/sec. (film surface temp. 30°C) |

This operation produced a stretched film of the following description:

| Average thickness of stretched film | 19 μ |
|---|---|
| Dispersion of thickness | T.D. ± 1.3 μ |
|  | (± 6.8% relative to average thickness) |

EXAMPLE 2

Stretching was carried out by the use of an apparatus of this invention illustrated in FIG. 2 but excluding the air-cooling ring and the draft tube, under the conditions indicated below.

| Resin used | Polypropylene (MFI 2.0) "Shoallomer FA120" |
|---|---|
| Thickness of raw film | 750μ |
| Folded width of raw film | 154 mm |
| Stretching ratio | M.D. 6.20 × T.D. 6.30 |
| Speed | 2.1 m/min. in raw film feeding speed |

| | |
|---|---|
| Inner pressure of stretched film | 13.0 m/min. in stretched film speed<br>100 mm Aq. |
| Temperature conditions: | Device interior |
| Hot air-circulation type heater unit | 135°C |
| Upper stage, preheater barrel | 196°C |
| Medium stage, preheater barrel | 225°C |
| Lower stage, preheater barrel | 243°C |
| Stretching barrel | 127°C |
| Water of water-cooling jacket | 20°C |
| Air speed at upper air curtain | 7 m/sec |

This operation produced a stretched film of the following description.

| | |
|---|---|
| Average thickness of stretched film | 19 μ |
| Dispersion of thickness | T.D. ± 1.35 μ<br>(±7.1% relative to average thickness) |

EXAMPLE 3

Stretching was carried out under the conditions indicated below, by the use of an apparatus of FIG. 2 additionally incorporating a shielding plate as illustrated in FIG. 11.

| | |
|---|---|
| Resin used | Polypropylene (MFI 2.0), "Shoallomer FA120" |
| Thickness of raw film | 750μ |
| Folded width of raw film | 154 mm |
| Stretching ratio | M.D. 6.25 × T.D. 6.30 |
| Speed | 2.4 m/min. in raw film feeding speed<br>15.0 m/min. in stretched film speed |
| Inner pressure of stretched film | 101 mm Aq. |
| Temperature conditions: | Device interior |
| Hot air-ciriculation type heater unit | 140°C |
| Upper stage, preheater barrel | 200° |
| Medium stage, preheater barrel | 230°C |
| Lower stage (1), preheater barrel | 240°C |
| Lower stage (2), preheater barrel | 250°C |
| Medium stage, stretching barrel | 150°C |
| Lower stage, stretching barrel | 100°C |
| Water of water-cooling jacket | 21°C |
| Air speed at air curtain | 7.5 m/sec. |
| Air speed at lower end of draft tube | 2.0 m/sec. |

This operation produced a stretched film of the following description:

| | |
|---|---|
| Average thickness of stretched film | 19 μ |
| Dispersion of thickness | T.D. ± 0.95 μ<br>(± 5% relative to average thickness) |

In Examples 1, 2 and 3, methods and apparatuses employed were unlike one another, while resins used, thicknesses of raw films, folded widths of raw films and stretching ratios were substantially alike. In Example 1, the stretching was performed by using the apparatus shown in FIG. 2. In Example 2, the operation was carried out by the use of the apparatus of FIG. 2 excluding the draft tube and the air-cooling ring. In Example 3, the operation involved the use of the apparatus of FIG. 2 which additionally incorporated a shielding plate.

Although the average thickness of stretched film was invariably 19 μ, the dispersion of thickness decreased in the order of Example 2, Example 1 and Example 3. In Example 1 and Example 3, the feeding speed of raw film and the stretched film speed were greater than in Example 2. This indicates that the productivity of the operation was greater in the former two examples than in the latter example. The comparison clearly shows that incorporation of said draft tube and air-cooling ring and that of said shielding plate additively contributed to increasing the productivity and decreasing the unevenness of film thickness.

EXAMPLE 4

Stretching was carried out by the use of the apparatus shown in FIG. 2, under the conditions indicated below:

| | |
|---|---|
| Resin used | High-density polyethylene (MI 0.25), "Sholex 3502" |
| Thickness of raw film | 355 μ |
| Folded width of raw film | 154 mm |
| Stretching ratio | M.D. 6.25 × T.D. 6.30 |
| Speed | 3.97 m/min. in raw film feeding speed<br>25.0 m/min. in stretched film speed |
| Inner pressure of stretched film | 85 mm Aq. |

Temperature conditions:

|  | Device interior |
|---|---|
| Hot air-circulation type heater unit | 135°C |
| Upper stage, preheater barrel | 170°C |
| Medium stage, preheater barrel | 185°C |
| Lower stage, preheater barrel | 205°C |
| Stretching barrel | 100°C |
| Water of water-cooling jacket | 20°C |
| Air speed at upper air curtain | 7.5 m/sec. |
| Air speed at lower end of draft tube | 2.0 m/sec. |

This operation produced a stretched film of the following description:

| Average thickness of stretched film | 9 μ |
|---|---|
| Dispersion of thickness | T/D. ± 0.6 μ (± 6.67% relative to average thickness) |

EXAMPLE 5

The results of stretching obtained when the upper portion of the preheater barrel was left open and when the same upper portion was closed with an air curtain are compared.

The raw film and the stretching conditions were identical to those of Example 1.

|  | Air curtain used (Identical to Example 1) | No air curtain (Upper portion of preheater barrel of Example 1 left open) |
|---|---|---|
| Difference of temperature of raw film in circumferential direction at the preheater barrel inlet ($T_{max} - T_{min}$) | 2°C | 8°C |
| Average thickness of stretched film | 19 μ | 19 μ |
| Dispersion of film thickness (T.D.) | ±1.3 μ | ±2.3 μ |
| Percentage of dispersion relative to average thickness | ± 6.8% | ± 12% |

It is apparent from the forgoing comparison that inclusion of the air curtain in the upper portion of the preheater barrel was quite effective in lessening temperature difference of the raw film at the inlet of the preheater barrel and decreasing the variation of film thickness.

EXAMPLE 6

The results of stretching obtained when the apparatus was provided with a water-cooling jacket at the lower portion of the stretching barrel and when the apparatus excluded such jacket are compared.

As explained in the detailed description of the invention, the water-cooling jacket is effective in improving the molding stability of stretched film.

The molding stability is expressed in terms of the amplitude of variation in the motive power of the drive motor for the lower nip rollers. It has experimentally been ascertained that the stability increases with the decreasing amplitude of this variation.

In the present example, the amplitude of variation in the motive power of the drive motor for the lower pair of nip rollers was determined by converting the amperage reading of an ammeter attached to said motor into corresponding voltage by means of a transducer and recording the voltage on a millivoltmeter. With the exception of the water-cooling jacket, the resin of raw film and the stretching conditions were identical with those of Example 1.

|  | Water-cooling jacket used (identical to Example 1) | No water-cooling jacket used |
|---|---|---|
| Average thickness of stretched film | 19 μ | 19 μ |
| Dispersion of film thickness (T.D.) | ±1.3 μ | ±2.5 μ |
| Percentage of dispersion relative to average thickness | ±6.8% | ±13% |
| Average voltage reading of millivoltmeter | 9 mV | 9 mV |
| Amplitude of variation in voltage | ±0.2 mV | ±0.4 mV |

The comparison indicates that incorporation of the water-cooling jacket reduced the variation in motive power markedly.

We claim:

1. An improved apparatus for the manufacture of a tubular biaxially stretched film of synthetic resin, composed of an upper pair of nip rollers adapted to introduce a tube of film of synthetic resin, a lower pair of nip rollers rotated at a greater speed than said upper nip rollers, a heater unit disposed to intervene between said two pairs of nip rollers, a V-shaped stabilizer plate and a gas-introducing unit, the improvement comprising in combination (a) a preheater barrel consisting of (a′) a head portion adapted to permit passage of the tube of film and impede passage of gas and (a″) the inner wall of which has a diameter greater than the diameter of the tube of film, gains stepwise in diameter downwardly and outer wall incorporates an indirect heater element and (b) a stretching barrel adjoining the lowermost end of said preheater barrel and formed of an inner wall which has a diameter greater than that of the stretched tube of film and an outer wall which incorporates an indirect heater element and (c) a cooling jacket disposed below half the height of and beyond said stretching barrel around the path of the stretched tube of film to effect abrupt cooling of the tube of film by intercepting the radiant heat emanating from the outer wall of the stretching barrel toward the tube of film.

2. An apparatus set forth in claim 1, wherein the head portion of the preheater barrel has the structure of air curtain.

3. An apparatus set forth in claim 1, wherein the head portion has a plurality of circular sheets of a rubbery substance each having cuts formed from the center toward the circumference are layered in such way that the cuts in each succeeding layer are staggered from those in the preceding layer.

4. An apparatus set forth in claim 1, wherein there is additionally incorporated below the cooling jacket a draft tube provided with an air-cooling ring adpated to effect suction of gas so as to establish a current of gas along the surface of the tube of film.

5. An apparatus set forth in claim 1, wherein there is additionally incorporated prior to the preheater barrel a means for giving preliminary heating to the raw film.

6. An apparatus set forth in claim 1, wherein there are additionally incorporated prior to the stretching barrel a plurality of slit heaters adapted to effect adjustment of the thickness of the tube of film.

7. An apparatus set forth in claim 4, wherein there is additionally incorporated prior to the preheater barrel a means for giving preliminary heating to the raw film.

8. An apparatus set forth in claim 4, wherein there are additionally incorporated prior to the stretching barrel a plurality of slit heaters adapted to effect adjustment of the thickness of the tube of film.

9. An apparatus set forth in claim 1, wherein there are additionally incorporated shielding plates within the preheater barrel and the stretching barrel.

10. An apparatus set forth in claim 4, wherein there are additionally incorporated shielding plates within the preheater barrel and the stretching barrel.

* * * * *